(No Model.)
M. J. POINDEXTER.
TOOL SHANK.
No. 423,951. Patented Mar. 25, 1890.
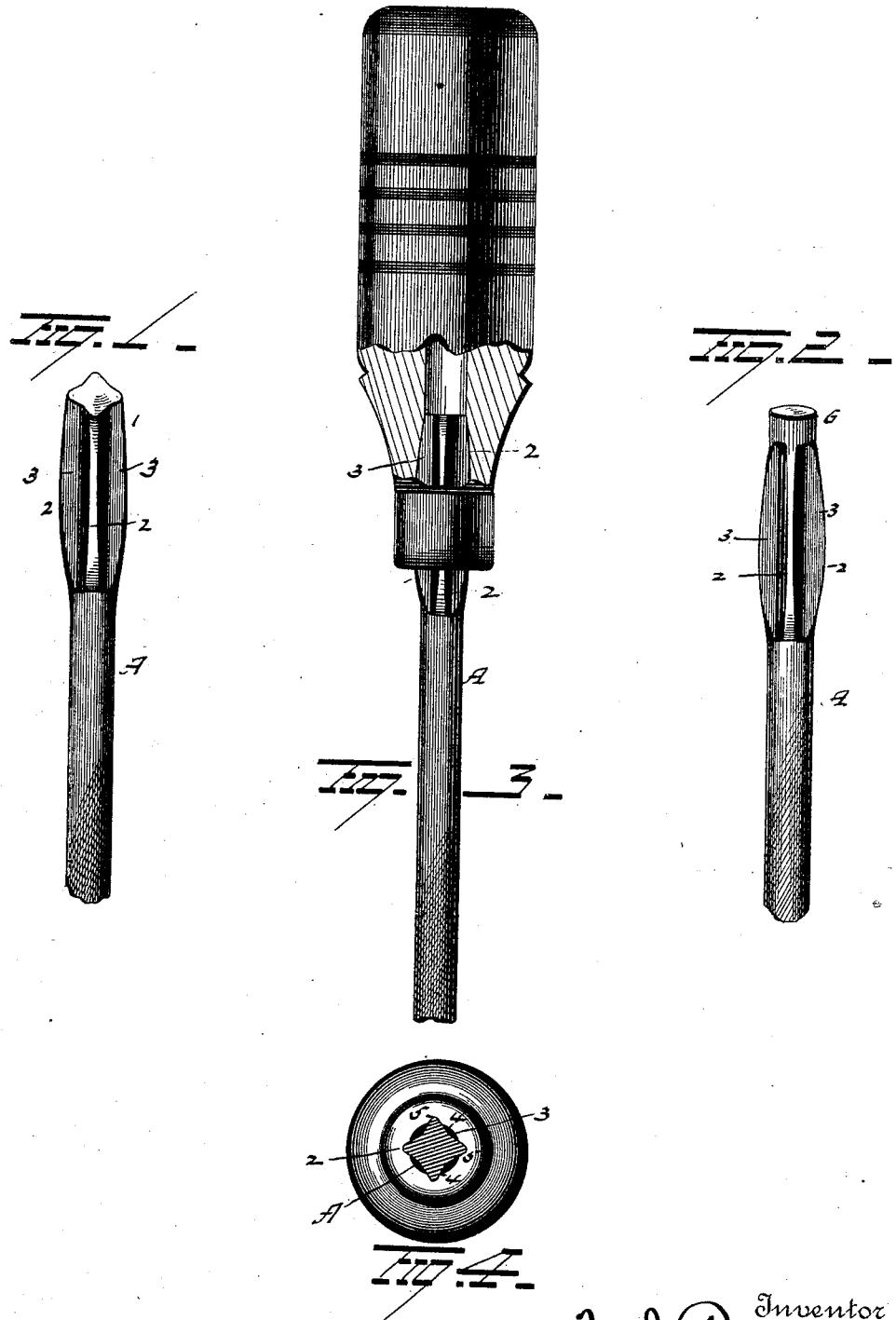

UNITED STATES PATENT OFFICE.

MARTIN J. POINDEXTER, OF READING, PENNSYLVANIA.

TOOL-SHANK.

SPECIFICATION forming part of Letters Patent No. 423,951, dated March 25, 1890.

Application filed December 5, 1889. Serial No. 332,643. (No model.)

*To all whom it may concern:*

Be it known that I, MARTIN J. POINDEXTER, of Reading, in the county of Berks and State of Pennsylvania, have invented certain new and useful Improvements in Tool-Shanks; and I do hereby declare the following to be a full, clear, and exact description of the invention, such as will enable others skilled in the art to which it appertains to make and use the same.

My invention relates to an improvement in tool-shanks, the object being to greatly reduce the expense of making tools and produce a greatly-improved article; and it consists in a tool-shank the tang or end of which is rolled or forged into shape in order to enter the handle of the tool readily and hold it in place against accidental displacement.

It further consists in certain novel features of construction and combinations of parts, as will be hereinafter described, and pointed out in the claims.

In the accompanying drawings, Figure 1 is a view in perspective of one form of shank. Fig. 2 is a modification; and Figs. 3 and 4 show the shank in a handle, a portion of the latter in Fig. 3 being broken away.

A represents the shank of the tool, such as a screw-driver or similar instrument. The rear end 1 of this shank is rolled or forged into substantially the shape shown—that is, with several sharp-edged ribs 2 2, preferably four in number. These ribs are usually rounded from end to end, and by tapering thus the insertion into the handle is made easy. It will be observed that the ribs are comparatively narrow, having V-shaped grooves 3 3 between them. This allows the shank to pass easily into the handle and at the same time effects a secure and permanent fastening. Several more or even less of these ribs may be employed.

The socket 4 in the handle is made by boring a round hole longitudinally into one end, and a number of notches 5 5 are made in the socket to correspond with the ribs, and they are adapted to receive the latter and prevent the shank from turning in the handle or from slipping out accidentally. The notches are not made very deep, and hence they simply serve as guides for the ribs to start in, and as the shank is forced in, the ribs make their way through the notches, enlarging them as much as required. The great advantage of the construction is that it is impossible to turn the shank because the edges of the ribs are sunk so far in the socket, and while it is possible to remove the shank by pulling it endwise it can never enlarge the socket or work loose by turning the slightest degree therein.

In the modification the ribs are just the same as in the other construction, but made a short distance from the end of the shank, so that the extreme end 6 remains just like the rest of the shank, the object of this round end being to guide the ribbed portion to make it follow the shank straight or uniformly in order to make it set true in the handle.

It is evident that slight changes might be resorted to in the form and arrangement of the several parts described without departing from the spirit and scope of my invention, and hence I do not wish to limit myself to the exact construction herein set forth; but, Having fully described my invention, what I claim as new, and desire to secure by Letters Patent, is—

1. A tool-shank having ribs thereon pressed out of the shank, said ribs being rounded from end to end, substantially as set forth.

2. A tool-shank having a round body and end and angular ribs formed in the body near the end, the said ribs projecting laterally beyond the periphery of the shank, substantially as set forth.

In testimony whereof I have signed this specification in the presence of two subscribing witnesses.

MARTIN J. POINDEXTER.

Witnesses:
 GATTEN B. STEVENS,
 F. PIERCE HUMMEL.